Patented Jan. 28, 1936

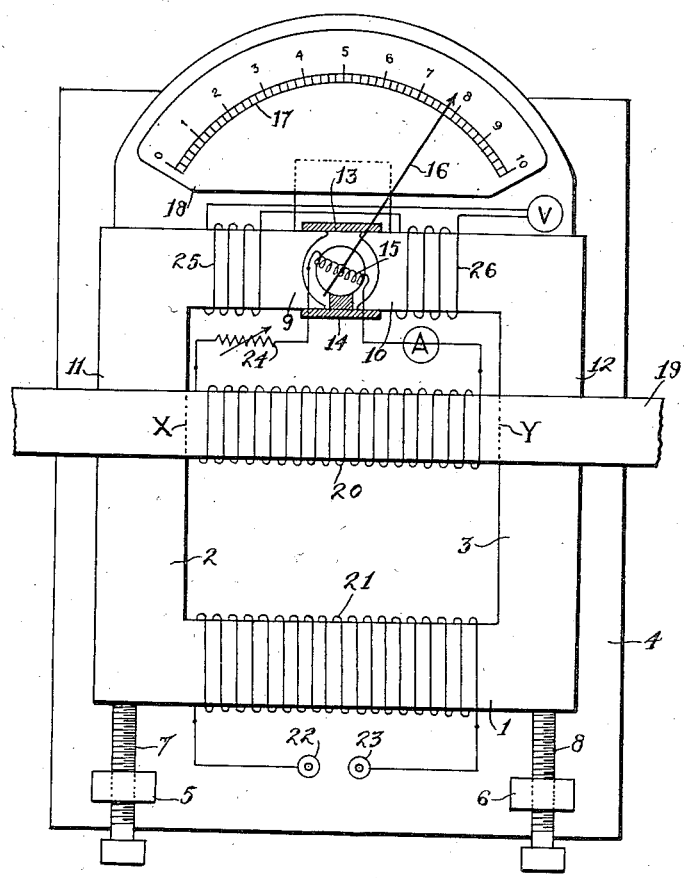

2,029,023

UNITED STATES PATENT OFFICE 2,029,023

INSTRUMENT FOR MEASURING CORE LOSS IN MAGNETIC MATERIALS

Paul L. Hoover, Middlebush, N. J., assignor to Endowment Foundation, New Brunswick, N. J., a corporation of New Jersey Application June 14, 1935, Serial No. 26,683

20 Claims. (Cl. 175—183)

This invention relates to an instrument for measuring the energy loss in magnetic material such as iron or steel when a varying magnetic flux is produced in the magnetic material. This energy loss is due to two effects produced by the varying magnetic flux; namely, hysteresis and eddy currents.

Different methods have heretofore been proposed for the measurement of these iron losses (these losses are commonly referred to as core losses). Invariably these methods consist of a magnetic core which is completely constructed of material to be tested and inserted in a winding form which has previously been made according to standard dimensions. One of the best known instruments of this type is known as the "Epstein core loss apparatus".

The Epstein instrument comprises four winding forms generally arranged in the form of a square, into which must be inserted four cores carefully prepared from the material whose core loss is to be measured, after which the corners of the core are clamped together, usually while current is applied to the windings. The core loss is measured by a standard watt meter or its equivalent which is connected in the circuit furnishing current to the windings of the instrument. The various steps involved in the use of such an instrument are more or less laborious and hence rather expensive.

Therefore, the principal object of my invention is to provide an instrument for measuring core loss in magnetic material which is much simpler and cheaper in construction, and very much simpler in its operation than those heretofore proposed or used.

Another object of my invention is to provide a core loss instrument as a single integral apparatus.

Other objects will be pointed out as the description proceeds.

In the drawing illustrating the principles of my invention and which is rather diagrammatic, 1 is a yoke of magnetic material having pole arms 2 and 3 mounted on a base or support member 4 having brackets or lugs 5 and 6 extending therefrom and carrying, respectively, adjusting screws 7 and 8 which engage the yoke member 1 for a purpose which will be later pointed out. Also carried on the base 4 are two additional yoke members 9 and 10 having pole arms 11 and 12 which are in alignment with but spaced from the arms 2 and 3 and preferably have a cross-sectional area of the same mechanical dimensions as the arms 2 and 3. It is to be understood that the entire magnetic circuit, including the yokes 1, 9, and 10 with their respective poles as well as the test sample 19, are made up of laminated sheet material. The adjacent ends of the yoke members 9 and 10 are supported in any satisfactory manner as by the non-magnetic members 13 and 14, these ends being arcuately formed to provide a field for a moving system including a coil 15 carrying a pointer 16 which is adapted to function in connection with a scale 17 on the scale plate 18 which may be supported by the base 4. Essentially, the parts 15 to 18 comprise a meter of the D'Arsonval type; that is to say, the meter coil 15 is adapted to rotate between the magnetic pole pieces between which it is positioned. In the D'Arsonval type of movement a small iron cylinder is placed concentric with the pole pieces and coil so as to produce a uniform radial field and thus give a uniform scale for the meter, all of which is standard meter practice.

The sample 19 of magnetic material to be tested is passed through a measuring coil 20 of suitable size and then the yoke 1 is moved by the screws 7 and 8 so as to clamp the test piece 19 in position between the respective pole pieces 2 and 11 and 3 and 12. The yoke 1 carries a magnetizing coil 21 of suitable size, the terminals of which are brought out at 22 and 23 whereby the magnetizing coil 21 may be connected to a source of current having a voltage wave form of suitable characteristics.

Connected in series with the coil 20 and the meter coil 15 is an adjustable resistance 24 which is preferably noninductive, and an ammeter A. The resistance 24 is of a value such that the ohmic resistance of the meter circuit is greatly in excess of the inductance, whereby this factor can be neglected in the equations hereinafter referred to. In some cases the winding 20 may be of relatively high resistance material, thus eliminating the separate external resistance 24. Also, the yoke members 9 and 10 may carry, respectively, coils or windings 25 and 26 adapted to be connected to a voltmeter V, the purpose of which will be later referred to.

Now it may be shown mathematically that the loss in the test bar 19 between the planes within the dotted lines X and Y, between which the distance is L and the cross-section of the test piece 19 is C, is:

$$\text{Total loss} = K \int (M.M.F.) \, I \, dt \text{ (watts)} \quad (1)$$

wherein K is a constant and M. M. F. is the magneto-motive force between the planes X and Y, and I the current through the ammeter A. It is important to keep in mind that the inductance of the circuit external to the winding 20 is very small compared to the resistance 24.

The average force on the coil of a D'Arsonval movement equals $$F = \frac{K}{T}\int (M.M.F.)Idt \quad (2)$$

where T is the time considered. If T is taken as one second, then the average force per second is obtained, which then gives the energy per second or power. Therefore, this instrument may then be calibrated directly in watts, and it is seen that a D'Arsonval movement such as described can be used to measure the total core loss in a magnetic sample, provided only that:

1st—The field of the meter is proportional to the M. M. F. across the sample.

2nd—The current through the meter coil is proportional to the rate of change of flux in the sample or test bar.

In the core loss instrument as so far described, the M. M. F. across the meter is the M. M. F. across that part of the test bar which is between the yoke pole pieces 2 and 3 and the planes X and Y. Therefore the instrument measures only the loss in the test bar between the planes X and Y, and the loss in the remainder of the magnetic circuit is not a factor in the results. Because of this, it is not necessary to have the entire magnetic circuit composed of the material on test.

In this respect the present instrument is different from the previous instruments used for measuring core losses. In order to meet the second necessary condition for the meter to read properly, it is only necessary to connect the meter coil winding 15 to the coil 20 through a resistance 24 which is large compared to the inductance of this circuit. This condition is easily met since the inductance in the meter coil circuit is normally very small. Thus, by inserting a single sample bar 19 into the instrument as above described and connecting the source of alternating current to the terminals 22 and 23, the core loss in the sample may be read directly on the scale of the instrument. Since it is necessary to know the value of the flux density that corresponds to the particular value of core loss, the meter A can be calibrated to read directly the flux density in the test sample.

The meter scale 17 may be calibrated in a plurality of ways. An empirical method, which I have found to be quite satisfactory, is to take readings on a test bar which has previously been measured by some other apparatus such as the Epstein instrument previously referred to. Knowing the total watts loss in the sample in the Epstein instrument, these values for any flux density in the sample 19 can be transferred directly to the scale 17.

Another method of calibrating the scale is to apply an auxiliary winding over the winding 20 on the sample 19 and connect across this winding a suitable resistance in circuit with an ammeter. With this auxiliary circuit open, the pointer 16 is set at any convenient point on the scale 17; then on closing the circuit of this auxiliary winding through the resistance and the ammeter, the increase in scale deflection is observed. This increase is the watts loss due to the addition of this auxiliary circuit, and this increase in watts loss is readily computed from the known value of resistance and current, and the watts-per-unit scale deflection is thus obtained.

A further method is based on Formula (1) heretofore given. In this equation, I is the current through the meter coil and this may be independently obtained and adjusted from some external source. The M. M. F. of Equation (1)—which is the M. M. F. across the air gap within which the meter coil 15 moves—may be produced by the use of coil 20 which is normally connected to the meter coil, but for calibration purposes is connected to an external circuit carrying another known current $i_2$. From standard electrical theory, it is known that the M. M. F. produced by any coil is given; i. e.:

$$M.M.F. = .4\pi ni \quad (3)$$

Therefore the M. M. F. across the air gap is known and the watts loss is therefore equal to $R \times i_1 i_2$, where R is the resistance in the meter circuit when it is used for measuring purposes, and $i_1$ and $i_2$ are the currents which are sent to the meter coil and coil 20 respectively in this calibration arrangement.

The calibration of the meter A as previously referred to follows directly from the standard transformer formula:

$$B_M = I\left(\frac{R10^8}{4.44fnA}\right) \quad (4)$$

It may sometimes also be desirable to measure or know the value of the magnetic force H that is impressed upon the sample. To do this, the coils 25 and 26 of a suitable number of turns are wound upon the yoke members 9 and 10, connecting the terminals of these coils or windings to a meter V which is calibrated directly in gilberts. Since the voltage induced in the coils 25 and 26 is proportional to the total flux in the pole arms 11 and 12, and this flux in turn is proportional to the magneto-motive force across the specimen 19, and further because of the relatively large air gap between the yoke members 9 and 10, this direct proportionality is assured.

The calibration of meter V in terms of gilberts is had directly from Equation (3) by sending a known current I through the coil 20 of $n$ turns and computing the M. M. F. and then calibrating the scale of the meter V directly.

The entire instrument then, including meters A and V which may be built in as a part of the entire structure, will read total core loss, flux density and magneto-motive force H. A calculation or simple division of flux density by magneto-motive force per unit distance will give permeability, another constant that the designer of electrical apparatus has occasion to use.

From what has been said, it will be readily understood that the test sample may be of any shape and the magnetic circuit as a whole may consist of a multiplicity of bars, yokes or the like, but the loss as recorded by the meter is only the loss in that part of the circuit across which the M. M. F. drop is taken.

While I have shown a D'Arsonval type of movement for indicating the core loss; that is to say, the moving coil is supported by jewel bearings with leads brought out by small hair springs, the loss meter may be of the standard suspension type galvanometer which, as a matter of fact, will give greater sensitivity than the two-pivot type of movement. Even if the wave form of the voltage impressed on the exciting coil 21 is not sinusoidal, the meter will still read the total core loss for that wave form and the ammeter A will read the average value of flux density as long as the ammeter reads the average value of the current or can be calibrated in terms of the average value of current.

From what has been said, it will be observed that the instrument, as far as core loss measurement is concerned, is an integral piece of apparatus and much simpler and more compact, and much easier to operate than instruments of this class heretofore proposed.

What I claim is:

1. An instrument for the purpose described including, a core section of magnetic material carrying a magnetizing coil therefor, a pair of elements of magnetic material having portions spaced from cooperating portions on said core section to form gaps for a piece of magnetic material to be tested, said pair of elements having opposed polar formations, a moving coil positioned for movement between said polar formations, an index device operated by said coil, a scale for said index device and a winding for the material to be tested, said winding being connected in circuit with said moving coil, the ohmic resistance of said circuit being large compared with the inductance thereof.

2. An instrument as set forth in claim 1, further characterized in that an additional resistance of suitable amount is connected into said moving coil circuit to always insure that the resistance of the circuit is large compared with the inductance thereof.

3. An instrument for the purpose described including, sections of magnetic material spaced apart to receive a test piece, a winding for said test piece, means for magnetizing at various strengths that section of material on one side of the test piece as well as the test piece when in position, a moving coil positioned between portions of said sections of material on the opposite side of the test piece, and connected in circuit with the winding on the test piece, means for indicating the movement of said moving coil, and means for insuring that the ohmic resistance of the moving coil circuit is large compared with the inductance thereof.

4. An instrument for the purpose described including, a magnetizable core section having pole arms and carrying a coil for magnetizing the section and arms at various strengths, said pole arms being adapted to receive a test bar across them for magnetization thereof, and means for measuring, directly in watts, the losses in said test bar, said means including a pair of core members each having an arm to cooperate with one of said first-mentioned arms, said pair of core members having arcuately formed polar faces with a moving coil therebetween, a winding on the test bar connected in circuit with said moving coil, and means for indicating the position of the moving coil, the resistance of the moving coil circuit being large compared to the inductance thereof.

5. An instrument as set forth in claim 4, further characterized in that said core section is adjustable to receive into the instrument test bars of different size and for clamping these bars securely against said pair of core member arms.

6. An instrument for the purpose described including, a base, two U-shaped core structures of magnetic material carried by the base with the arms of each U extending toward each other but spaced apart, one structure being adjustable with respect to the other for varying the space between said arms, said space being adapted to receive a test bar therebetween, a winding between said arms to receive said test bar, one of said U-shaped structures being divided and provided with arcuate opposed faces with a coil movably positioned therebetween, said coil being connected in an electrical circuit with said test bar winding, the ohmic resistance of said circuit being much greater than the inductance, an exciting winding on the other of said core structures for magnetizing the same and the test bar, and indicating means associated with said moving coil for reading directly in watts the core losses in said test bar.

7. An instrument for the purpose described, including a core structure of magnetic material made up only in part, by the test bar and in part by yoke sections, a coil for magnetizing the core carried on one of the yoke sections, a coil on said test bar, an indicating device having a winding positioned in the core structure and connected in circuit with said coil on the test bar so the indications thereof may be made proportional to the core loss in the test bar only.

8. An instrument as set forth in claim 7, further characterized in that the indicating device comprises a meter having a magnetic field formed by separated parts of the core structure with the winding therein, whereby the magnetic field of the meter is proportional to the M. M. F. across the test bar and the current through the meter winding is proportional to the rate of change of flux in the test bar.

9. A complete structure including, an instrument as set forth in claim 7, further characterized in that an additional meter is arranged to be connected in series with said coil on the test bar and the winding on the indicating device, and calibrated to read flux density.

10. A complete structure including, an instrument as set forth in claim 7, further characterized in that an additional meter is arranged to be connected in series with said coil on the test bar and the winding on the indicating device, and calibrated to read flux density, and still further characterized in that the core adjacent to said indicating winding has a winding thereon connected to a meter calibrated to read the M. M. F. across the test bar.

11. An instrument for the purpose described including two magnetic sections having arms spaced to receive a test bar thereacross, a coil on one section for magnetizing it and the test bar to different degrees of density, a meter including a scale and pointer and a movable coil disposed in a substantial gap between portions of the other of said sections, a winding on the test bar between the arms of said sections and connected in series with said moving coil, the ohmic resistance of the circuit being much greater than the inductance.

12. An electrical measuring structure including, an instrument as set forth in claim 11, further characterized in that a second meter is connected in series with the first-mentioned meter and the winding on the test bar, and calibrated to read directly the flux density in the test bar.

13. An electrical measuring structure including, an instrument as set forth in claim 11, further characterized in that a second meter is connected in series with the first-mentioned meter and the winding on the test bar, and calibrated to read directly the flux density in the test bar, and further characterized in that a winding is arranged at least on one of the portions of said magnetic sections having the gap for the moving coil, a third meter connected to said last-mentioned winding and calibrated to read the M. M. F. across said test bar.

14. An instrument for the purpose described including, a core structure of magnetic material carrying a magnetizing winding and divided to receive a test bar which acts to complete a closed magnetic circuit, a meter having a winding positioned in the core structure on the opposite side of the test bar from said magnetizing winding, a winding on the test bar connected in circuit with said meter winding, the resistance of said circuit being much greater than the inductance, a pointer for the meter and a scale to cooperate with the pointer calibrated to read the watts loss in the test bar between the parts of the core structure spanned by it, at different degrees of magnetization of the bar.

15. An instrument as set forth in claim 14, further characterized in that a second meter is connected into the circuit with the first meter winding and calibrated to read flux density in the test bar.

16. An instrument as set forth in claim 14, further characterized in that a second meter is connected into the circuit with the first meter winding and calibrated to read flux density in the test bar, and still further characterized in that a winding is located on the core structure adjacent the first meter winding, and a third meter is connected to this core winding and calibrated to read the M. M. F. across said test bar.

17. An electrical measuring structure including an instrument as set forth in claim 11, further characterized in that a winding is arranged at least on one of the portions of said magnetic sections having the gap for the moving coil, and a meter connected to said last-mentioned winding and calibrated to read the M. M. F. across said test bar.

18. A complete structure including an instrument as set forth in claim 7, further characterized in that the core, adjacent to said indicating winding, has a winding thereon connected to a meter calibrated to read the M. M. F. across the test bar.

19. A complete structural instrument for measuring core loss and flux density in, and M. M. F. across, a test bar of magnetic material including, a permanent core structural frame work composed of divided yoke sections to receive the test bar therebetween, a coil for magnetizing a part of the yoke sections and the test bar when in place, a coil positioned within the confines of the frame work through which the test bar may be passed, an indicating device having a winding positioned in the core structure on the opposite side of the test bar from said magnetizing coil and connected in circuit with said test bar coil, and calibrated to read the core loss in the test bar, a meter connected in circuit with said test bar coil and said indicating device winding, and calibrated to read flux density in the test bar, a winding on the core adjacent to said indicating winding, and a meter connected in circuit therewith and calibrated to read the M. M. F. across the test bar.

20. An electrical measuring instrument for measuring the core loss in a test bar of magnetic material including, a permanent core structural framework composed of divided adjustable yoke sections to receive the test bar therebetween, a coil on one of the yoke sections for magnetizing it and the test bar when in place, a coil for the test bar positioned within the confines of the framework, an indicating device having a winding positioned in the core structure on the opposite side of the test bar from said magnetizing coil and connected in circuit with said coil for the test bar, and calibrated to read directly the core loss in the test bar.

PAUL L. HOOVER.